United States Patent [19]

Koch

[11] Patent Number: 5,342,638

[45] Date of Patent: Aug. 30, 1994

[54] PROCESS FOR TRANSFERRING COFFEE AROMAS TO AN OIL

[75] Inventor: Peter Koch, Orbe, Switzerland

[73] Assignee: Nestec S.A., Vevey, Switzerland

[21] Appl. No.: 913,134

[22] Filed: Jul. 14, 1992

[30] Foreign Application Priority Data

Aug. 7, 1991 [CH] Switzerland ............ 2340/91

[51] Int. Cl.$^5$ ............... A23F 5/48
[52] U.S. Cl. ............ 426/386; 426/387; 426/388; 426/594
[58] Field of Search ............ 426/594, 386–388

[56] References Cited

U.S. PATENT DOCUMENTS

| | | | |
|---|---|---|---|
| 3,939,291 | 2/1976 | Katz | 426/386 X |
| 4,007,291 | 2/1977 | Siedlecki et al. | 426/386 X |
| 4,119,736 | 10/1978 | Howland et al. | |
| 5,229,153 | 7/1993 | Blanc | 426/386 |

Primary Examiner—Joseph Golian
Attorney, Agent, or Firm—Vogt & O'Donnell

[57] ABSTRACT

Coffee aromas are transferred to an oil by introducing a condensation product of a frost of carbon dioxide charged with coffee aromas and water into a heat-regulated enclosure having a lower portion for containing an oil bath and an upper portion for containing a layer of the frost introduced therein and for venting sublimed carbon dioxide. To carry out the process, the oil bath is regulated at a temperature above the freezing point of the oil, and the temperature in the enclosure above the oil bath is regulated so that during introduction of the frost into the enclosure, a layer of frost is formed and maintained above the bath, carbon dioxide of the frost is sublimated and water of the frost is melted. Sublimated carbon dioxide is vented from the enclosure, an aroma- and water-laden oil bath is removed from the enclosure and oil is added to the bath to replace oil removed from the enclosure, while introducing frost into the enclosure and regulating the temperatures. The bath removed is separated into aroma-laden oil and aroma-laden water components, and the aroma-laden water component may be contacted with an oil to obtain an aromatic oil.

7 Claims, 2 Drawing Sheets

PROCESS FOR TRANSFERRING COFFEE AROMAS TO AN OIL

BACKGROUND OF THE INVENTION

This invention relates to a process and for introducing coffee aromas into an oil for flavoring a soluble coffee powder.

Soluble coffee powder is conventionally produced by freeze-drying or spray-drying of a coffee extract obtained after evaporation by countercurrent percolation of an extraction liquid through cells filled with ground roasted coffee.

One of the major problems of this type of process lies in the fact that the product obtained does not have the flavor of a roasted coffee, which is particularly due, on the one hand, to the extraction process and, on the other hand, to the steps of evaporation and freeze-drying or spray-drying, which inevitably involve significant losses of flavor.

Various solutions have been proposed in which an oil, generally a coffee oil, is enriched with coffee aromas and then sprayed onto the soluble coffee powder or incorporated in a jar filled with soluble coffee powder.

The principal aroma source known and used for this purpose are the aromas released from ground roasted coffee.

One of the main problems to be solved in a process of this type is to be able to transfer the coffee aromas from the frost to the oil support.

French Patent No. 2,336,088, for example, describes a process in which an inert gas circulates through a ground roasted coffee. This inert gas becomes charged with aromas and a frost is formed by condensation of the carbon dioxide entrained, moisture and aromas. This frost is then contacted with an oil under predetermined temperature and pressure conditions so that the oil recovers part of the aromas present in the frost. The oil obtained may then be incorporated in a soluble coffee powder.

In the process described in the French Patent, a frost containing coffee aromas and carbon dioxide is placed in a container in which prevail a temperature above 0° C. and an absolute pressure above 35 bar, the water present in the frost is eliminated, and a certain quantity of liquid oil is then introduced into the container under pressure, the temperature and pressure conditions being such that the oil is above its freezing point.

The pressure is then slowly released, the oil being kept in the liquid state. An oil charged with coffee aromas is thus obtained.

This oil charged with aromas may then be used to flavor a soluble coffee powder, for example by spraying the oil onto the powder.

In another process which is described in European Patent Application No. 92104622.3, a step of contacting the oil with a frost is used to free the frost from these undesirable aromas. In a second step, the liquid residue obtained, which is still charged with aromas, is contacted with a second oil, which is the oil to be used to flavor the soluble coffee powder, the first oil being eliminated.

At all events, the method of transferring aromas from a frost to an oil described in French Patent No. 2,336,088 is unsatisfactory in many respects because it does not allow continuous production. Secondly, the conditions under which the aromas are transferred from the frost to the oil are not controlled. Finally, this known method has to be carried out under high pressure.

SUMMARY OF THE INVENTION

The problem addressed by the present invention was to enable an aromatic fraction contained in the frost to be transferred to a suitable supporting substance, for example an oil, by a method which can be carried out at atmospheric pressure, preferably continuously, with minimal losses of volatile compounds.

Accordingly, the present invention provides a process for transferring coffee aromas contained in a frost produced by the condensation of coffee aromas and water to an oil, for obtaining an oil enriched with coffee aromas for incorporation into a soluble coffee powder, comprising steps wherein:

the frost is transported into an enclosure containing a certain quantity of oil renewed by addition and removal of oil, the enclosure thus containing an oil bath surmounted by a bed of frost, the carbon dioxide is sublimated and the ice is melted, forming an emulsion with the oil, the emulsion is removed and the oil is separated from the liquid water.

It is possible by this process effectively to control the conditions under which the aromas are transferred to the oil both through the rate of renewal of the oil bath and through the ratio of water to oil in the emulsion produced.

The present invention also provides to an apparatus for carrying out the process described above comprising an enclosure equipped in its upper part with means for supplying frost, a vent for gaseous carbon dioxide, means for supplying and removing oil arranged in its lower part and means for controlling the temperature of the oil in the enclosure, the rate of sublimation of the frost and melting of the ice.

Other features and advantages will become apparent from the following description in conjunction with the accompanying drawings which are provided purely by way of example.

DETAILED DESCRIPTION OF THE DRAWINGS

Figure 1:
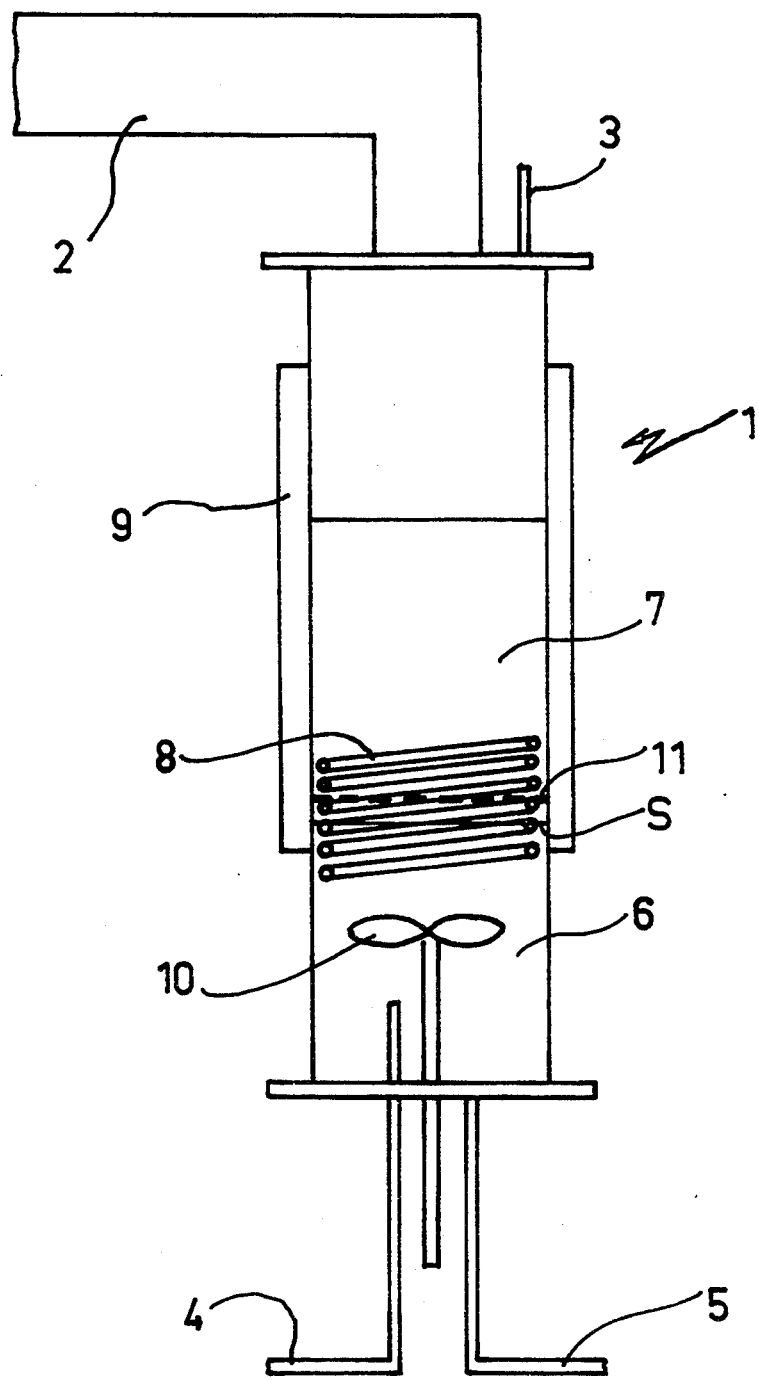
FIG. 1 illustrates an elevational view of an embodiment of an apparatus according to the invention.

FIG. 1 illustrates an enclosure 1 equipped in its upper part with means 2 for supplying frost and with a vent 3 for the removal of gaseous carbon dioxide produced by sublimation. The supply means 2 may be in the form of a screw accommodated in a heat-regulated housing.

In its lower part, the enclosure 1 comprises an oil feed pipe 4 And a removal pipe 5.

The enclosure 1 is intended to receive an oil bath 6 and a layer 7 of frost situated on the upper surface of the oil bath 6. The upper part of the oil bath 6 is defined by a surface S. A heat regulation system is also provided. This heat regulation system may be formed by a heat exchanger 8 arranged in the contact zone between the layer 7 of frost and the oil bath 6. The heat exchanger 8 may be disposed inside the enclosure, dipping into the oil bath and the layer of frost. In this case, it may be formed by a coil through which a heating fluid circulates or by a heating resistance.

In one variant of the apparatus according to the invention illustrated in FIG. 1, the depth to which the heat exchanger 8 dips into the oil bath 6 below the surface S and the height to which the heat exchanger 8 projects into the layer 7 of frost above the surface S may be regulated by vertical displacement of the heat exchanger 8 by any known means or by variation of the oil level in the enclosure 1.

A heat regulating and insulating jacket 9 may be provided on the outer surface of the enclosure 1 over all or part of its height.

A stirrer 10 may also be provided for the oil bath 6.

Finally, a horizontal grill 11 may be arranged near and preferably above the surface S of the oil bath 6 to prevent pieces of ice falling into the oil bath 6.

Figure 2:
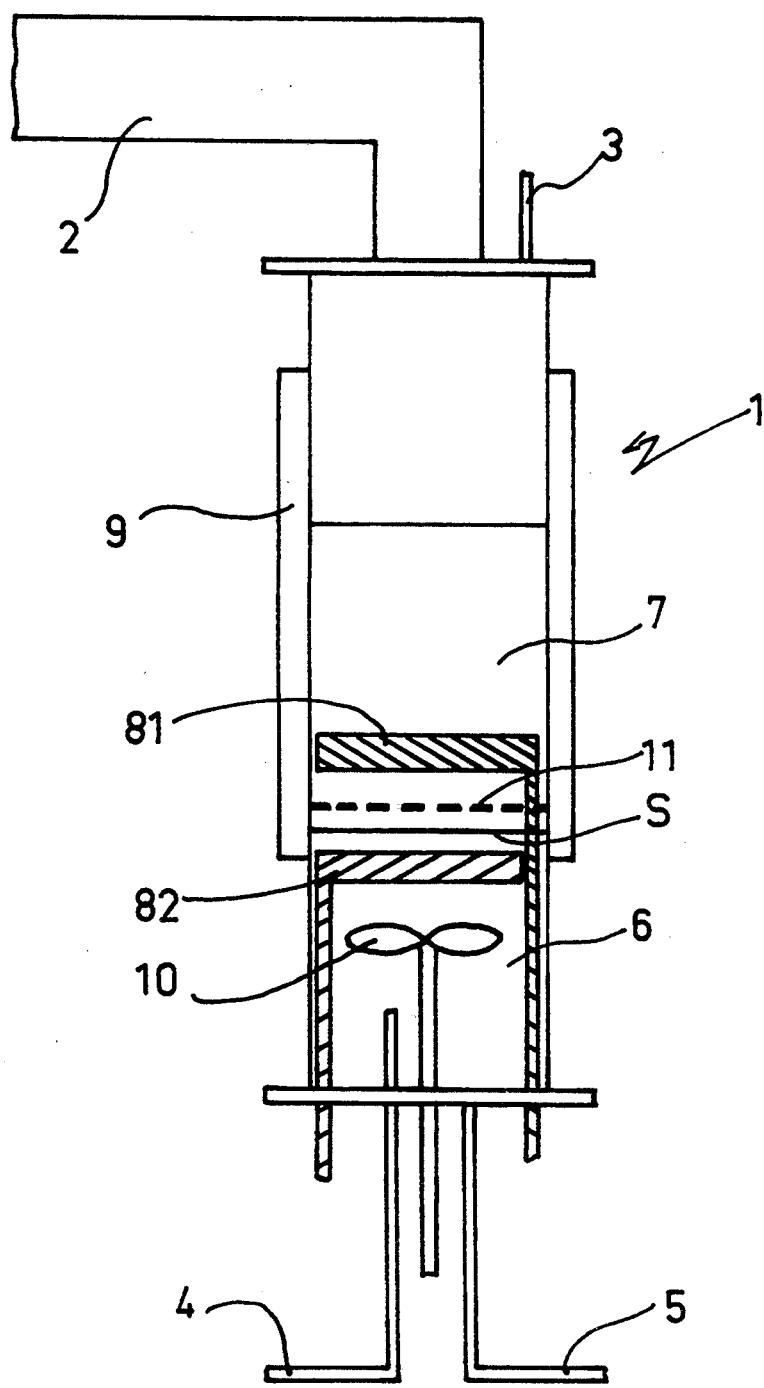
FIG. 2 illustrates an elevational view of another embodiment of an apparatus according to the invention.

In the embodiment of the apparatus according to the invention shown in FIG. 2, the heat regulating system consists of a first device 81 arranged above the surface S of the oil bath 6 and of a second device 82 arranged in the oil bath 6, preferably at mid-height. It is thus possible independently to regulate the energy input of the heat regulating device 81 arranged in the layer 7 of frost and the temperature of the heat regulating device 82 arranged in the oil bath.

In accordance with the process of the present invention, a frost charged with coffee aromas emanating from the cryogenic condensation of carbon dioxide charged with coffee aromas and with water is produced in known manner, for example as described in French Patent No. 2,336,088.

The aromatic fraction of this frost is very small. Typically, 1 kg frost consists of approximately 20 g aromas, 130 g ice and 850 g solid carbon dioxide.

The frost is transported by the supply means 2 into the enclosure 1 which contains the oil bath 6 renewed by addition and removal of oil through the pipes 4 and 5. The oil bath 6 is preferably stirred continuously by the agitator 10.

The heat exchanger 8 provides the energy required on the one hand to keep the temperature of the oil above its freezing temperature and, on the other hand, to sublimate the carbon dioxide and to melt the ice into water in the zone of the layer 7 of frost situated above the surface S of the oil bath 6.

The temperature of the heat exchanger, the height to which it projects into the layer 7 of frost above the surface S and the depth to which it is immersed in the oil bath 6 below the surface S can be adjusted to allow continuous sublimation of the carbon dioxide and melting of the ice according to the exact quantities introduced into the enclosure 1 by the supply means 2. The height of the layer 7 of frost above the oil bath 6 can also be adjusted by the same means.

The ice which contains the coffee aromas after sublimation of the carbon dioxide collects at the upper surface of the oil bath 6 where it melts on contact with the heat exchanger. The water then flows by gravity into the oil bath 6, forming an emulsion. The aromas are transferred to the oil in dependence upon the water-to-oil ratio of the emulsion.

The sublimated carbon dioxide formed ascends through the layer 7 of frost so that the aromas which may have been entrained by the gaseous carbon dioxide can be partly recondensed. By adjusting the height of the layer 7 of frost, it is possible to keep these aromatic losses to a minimum.

In one variant of the process, an additional quantity of aromas entrained by the gaseous carbon dioxide may be recovered by washing this gas in countercurrent with oil at the exit of the vent 3.

The emulsion removed through the pipe 5 thus contains an oil charged with coffee aromas and water itself charged with aromas. The oil and the water may be separated in any way, for example by decantation or centrifugation.

In a principal application of the invention, the oil obtained may subsequently be sprayed onto a soluble coffee powder.

In another application of the invention, the step in which the oil is contacted with the frost forms the first step of the process described in European Patent Application No. 92104622.3 cited above and is incorporated in the description by reference. In this case, it is the aqueous phase of the emulsion produced which is retained for contacting with a second oil to produce an aromatic oil which, for example, will be sprayed onto a soluble coffee powder.

EXAMPLES

The invention is illustrated by the following Examples in which percentages are by weight.

Example 1

Various tests were carried out by varying the water content of an emulsion to determine the quantity of aromas present in the oil and in the water. The results obtained illustrate the influence of the water-to-oil ratio on the transfer of aromas from the water to the oil and are summarized in the following Table in which $C1$ and $C2$ respectively represent the concentration of aromas in the water and the oil. Similarly, $Q1$ and $Q2$ respectively represent the quantities of aromas present in the water and in the oil.

| Quantity of water in the emulsion (%) | C1/C2 | Q1/Q2 |
|---|---|---|
| 0.5 | 17.4 | 0.09 |
| 2 | 6.4 | 0.13 |
| 2.6 | 5.4 | 0.14 |
| 9.4 | 3.2 | 0.33 |
| 14.5 | 2.5 | 0.42 |
| 35 | 2.1 | 1.13 |
| 52 | 1.8 | 1.95 |
| 67 | 1.4 | 2.28 |
| 83 | 1.3 | 6.35 |

It can thus clearly be seen that, the larger the quantity of water present in the emulsion, the smaller the quantity of aromas transferred to the oil. It is thus possible using emulsions rich in water to transfer only a small part of the aromas to the oil which, in addition, will be highly concentrated. It has also been found that, in this case, it is the least stable and least agreeable aromas which are transferred. It is thus possible, for example by centrifugation, to obtain a water still charged with aromas which has only lost its least agreeable aromas and which will be contacted with a second oil which will be the oil used to flavor the soluble coffee powder.

Example 2

1034 g/h frost were introduced into the enclosure from 300 kg/h roasted coffee. The frost contained 85.5% carbon dioxide, 12.6% ice and 1.9% aromas.

Accordingly, the aromas were introduced into the enclosure at a rate of 19.6 g/h.

A 17 cm deep layer of frost was formed, the temperature of the frost during sublimation was −78.5° C. and the average residence time was 54 minutes.

The oil bath (formed by an emulsion of oil and water) had a volume of 0.8 liter and a temperature of 30° C. with an average residence time of the oil of 34 minutes, the oil supply rate being 1.275 kg/h.

The oil-water emulsion was removed at a rate of 1.424 kg/h with an aroma output of 19 g/h. The water content of the emulsion was 9.1%.

95% of the aromas present in the frost are thus recovered in the emulsion by means of the process according to the invention.

Example 3

A frost identical with that of Example 1 was introduced into the enclosure under the same conditions.

A 4 cm deep layer of frost was formed, the temperature of the frost during sublimation was −78.5° C. and the average residence time was 13 minutes.

The oil bath (formed by an emulsion of oil and water) had a volume of 0.8 liter and a temperature of 30° C. with an average residence time of the oil of 34 minutes, the oil supply rate being 1.275 kg/h.

The oil-water emulsion was removed at a rate of 1.423 kg/h with an aroma output of 17.6 g/h. The water content of the emulsion was 9.1%.

89% of the aromas present in the frost are thus recovered in the emulsion by means of the process according to the invention.

This Example illustrates the influence of the residence time of the frost and the depth of the layer of frost on the recovery of the aromas.

Example 4

1299 g/h frost were introduced into the enclosure from 300 kg/h roasted coffee. The frost contained 90.8% carbon dioxide, 7.7% ice and 1.5% aromas. Accordingly, the aromas were introduced into the enclosure at a rate of 19.5 g/h.

An 8 cm deep layer of frost was formed, the temperature of the frost during sublimation was −78.5° C. and the average residence time was 20 minutes.

The oil bath (formed by an emulsion of oil and water) had a volume of 0.8 liter and a temperature of 30° C. with an average residence time of the oil of 34 minutes, the oil supply rate being 1.275 kg/h.

The oil-water emulsion was removed at a rate of 1.393 kg/h with an aroma output of 18 g/h. The water content of the emulsion was 7.2%.

More than 90% of the aromas present in the frost are thus recovered in the emulsion by means of the process according to the invention.

Comparison of Examples 2, 3 and 4 clearly shows the influence of the depth of the layer of frost on recovery of the aromas.

Example 5

1963 g/h frost were introduced into the enclosure from 300 kg/h roasted coffee. The frost contained 88.3% carbon dioxide, 10.2% ice and 1.5% aromas. Accordingly, the aromas were introduced into the enclosure at a rate of 29.5 g/h.

A 12 cm deep layer of frost was formed, the temperature of the frost during sublimation was −78.5° C. and the average residence time was 20 minutes.

The oil bath (formed by an emulsion of oil and water) had a volume of 0.8 liter and a temperature of 30° C. with an average residence time of the oil of 26 minutes, the oil supply rate being 1.620 kg/h.

The oil-water emulsion was removed at a rate of 1.848 kg/h with an aroma output of 28 g/h. The water content of the emulsion was 10.8%.

Almost 95% of the aromas present in the frost are thus recovered in the emulsion by means of the process according to the invention.

Finally, it will be noted that, in Examples 2, 3, 4 and 5, the quantities used may appear to be relatively small. More particularly, the volume of the bath formed by the oil and the water is less than 1 liter. However, the quantities in question are quantities used on an industrial scale. On the assumption that the oil separated from the water is used to flavor a soluble coffee powder, it is important to bear in mind that the quantity of oil sprayed onto the powder represents less than 1% of the weight of the powder and typically less than 0.5%.

If a production line producing 1000 kg/h soluble coffee powder from 2500 kg/h roasted coffee is taken as reference and if a ratio of oil to powder of 0.25% is desired, the output of flavored oil will amount to 2.5 kg/h.

Accordingly, it can be seen that the invention enables the quantity of flavored oil required for an industrial production line to be continuously provided in a very simple manner and with a very small apparatus.

I claim:

1. A process for transferring coffee aromas to an oil comprising:

transporting a condensation product frost of carbon dioxide charged with coffee aromas and water into a heat-regulated enclosure having a lower part for containing an oil bath and having an upper part for containing the frost and for venting sublimed carbon dioxide;

regulating a temperature of the oil bath at a temperature above a freezing point of the oil and regulating a temperature in the enclosure above the oil bath so that during introduction of the frost into the enclosure, a layer of frost is formed and maintained above the bath, carbon dioxide of the frost is sublimated and water of the frost is melted;

venting carbon dioxide sublimated from the frost from the enclosure upper part, removing aroma- and water-laden oil bath from the enclosure lower part, and adding oil to the bath to replace the oil removed from the enclosure, while introducing frost into the enclosure and regulating the temperatures; and separating the bath removed from the enclosure to obtain separated aroma-laden oil and aroma-laden water components.

2. A process according to claim 1 further comprising controlling a rate of adding oil to replace the oil removed from the enclosure to control aroma transfer to the oil bath.

3. A process according to claim 1 further comprising stirring the oil bath.

4. A process according to claim 1 wherein the oil bath temperature and the temperature in the enclosure above the bath are regulated independently.

5. A process according to claim 1 further comprising preventing frost pieces from falling into the oil.

6. A process according to claim 1 further comprising washing sublimated carbon dioxide vented from the enclosure with an oil.

7. A process according to claim 1 further comprising contacting the separated aroma-laden water component with an oil to obtain an aromatic oil.

* * * * *